United States Patent [19]

Atkinson

[11] 4,209,884
[45] Jul. 1, 1980

[54] METHOD OF FORMING VALVE SEATS

[75] Inventor: Eulas R. Atkinson, Conroe, Tex.

[73] Assignee: ACF Industries, Incorporated, New York, N.Y.

[21] Appl. No.: 212

[22] Filed: Jan. 2, 1979

[51] Int. Cl.² .................. B23P 15/00; B23P 11/02
[52] U.S. Cl. .................. 29/157.1 R; 29/451; 277/1
[58] Field of Search .......... 29/157.1 R, 421 R, 451, 29/235; 251/359, 365, 306; 277/1

[56] References Cited

U.S. PATENT DOCUMENTS

| | | | |
|---|---|---|---|
| 2,856,677 | 10/1958 | Rekettye | 29/235 |
| 2,925,994 | 2/1960 | Downs et al. | 29/157.1 R |
| 3,087,232 | 4/1963 | Dow | 29/157.1 R |
| 3,222,762 | 12/1965 | Nowlin | 29/157.1 R |
| 3,581,379 | 6/1971 | Drobilits | 29/450 |
| 3,694,894 | 10/1972 | Jelinek et al. | 29/451 |

Primary Examiner—Daniel C. Crane
Attorney, Agent, or Firm—Eugene N. Riddle

[57] ABSTRACT

A method of forming a valve seat having a resilient plastic insert received in a serrated groove of the seat. The insert is inserted into the groove and is pressed therein with a power driven ram to effect cold flowing of the insert into serrations in the sides of the groove. The insert is then subjected to hydraulic fluid at a relatively high pressure level to completely bottom the insert against the bottom of the groove prior to machining of a protruding sealing surface of the insert. The invention is directed additionally to another method which includes the step of swaging a lip into the insert to secure it in a non-serrated groove of a valve seat. Hydraulic fluid pressure is then applied to the insert to completely bottom it in the groove prior to installation of the seat in a valve body.

6 Claims, 11 Drawing Figures

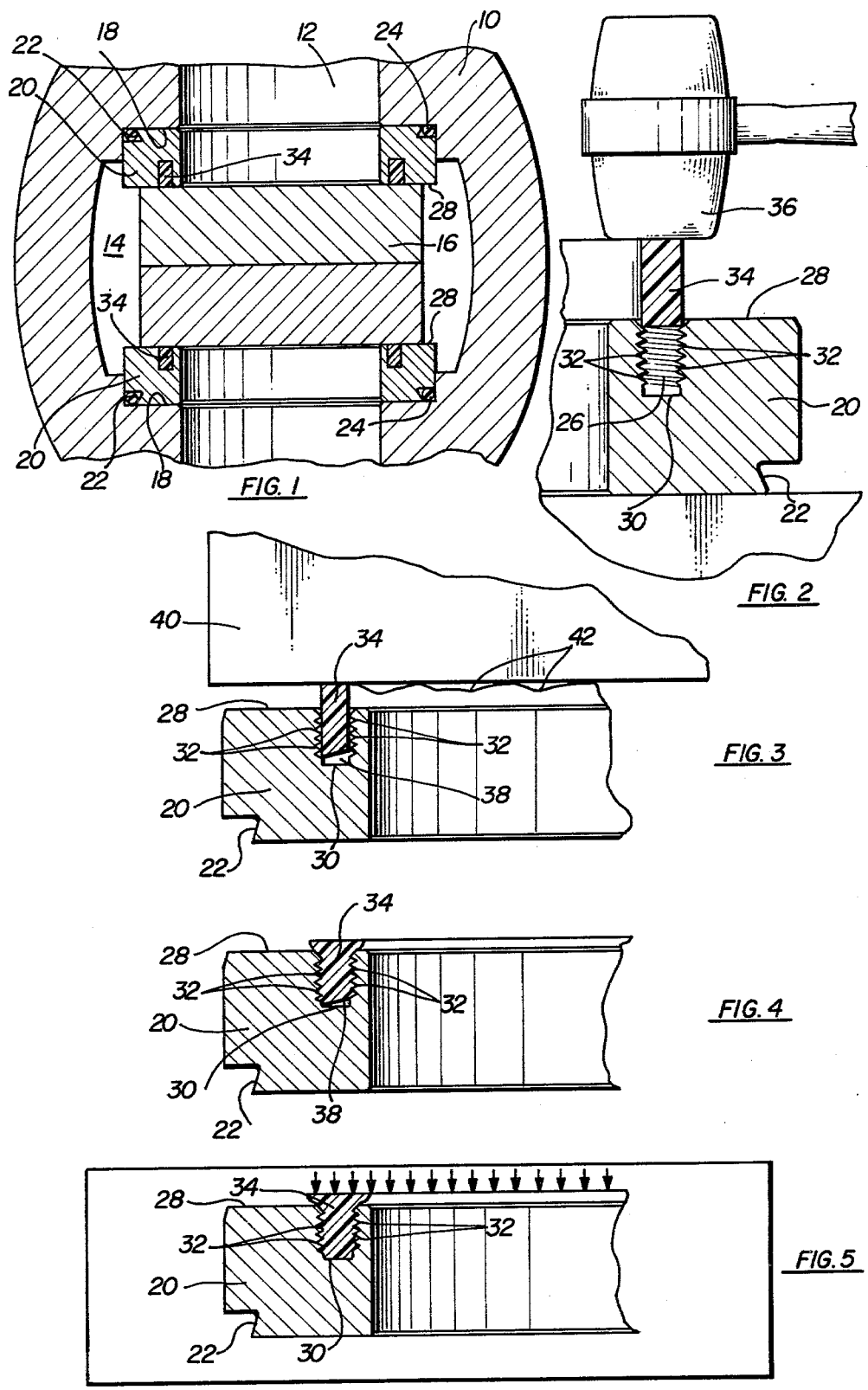

METHOD OF FORMING VALVE SEATS

BACKGROUND OF THE INVENTION

This invention relates generally to the manufacture of valve seats and more particularly to improvements in forming valve seats of the type which have plastic face seals for sealing against the valve member.

It has long been recognized that a plastic insert known as a face seal may be attached to a metallic valve seat to provide an effective seal against a gate or ball valve member. The inert is usually formed of material available under the trademark "Teflon", although various other substances having similar properties may be used with satisfactory results. Typical methods which have been used in the past to attach the face seals to the valve seats are disclosed in U.S. Pat. No. 3,087,232 to Dow and U.S. Pat. No. 3,222,762 to Nowlin. Although these methods have been used successfully for the most part, they have not been entirely satisfactory in all respects.

The primary problem has been that the plastic insert is not always bottomed out completely against the bottom of the groove in the metal seat ring. Due to distortion caused by hammering of the insert into the groove or by imperfections and deformities in the insert, the outer surface of the insert is often uneven. Consequently, when a power driven ram is applied to the insert to press it into the groove in a manner causing it to cold flow into the serrations of the groove, there are gaps between the bottom of the insert and the bottom of the groove. Such gaps also result when the bottom of the groove is uneven or when a non-uniform driving force is applied to the ram, as sometimes occurs. After the insert has been attached to the seat in this manner and machined to provide a sealing surface, the seat is installed in a seat pocket of the valve body.

In service, the fluid pressures that are applied to the valve act against the sealing surface of the insert and can press the insert further into the groove in those areas where gaps exist. This causes portions of the sealing surface of the insert to be depressed far enough that they cannot effectively seal against the valve member. In some cases, the sealing surface is actually depressed within the groove so that it cannot seal at all. As can easily be appreciated, the lack of a good seal results in substantial leakage of the valve.

Defective inserts are sometimes discovered before the valve is put in service, as during a shell test of the valve body wherein the valve is subjected to fluid pressure of approximately one and one half times working pressure to test the integrity of the valve body. However, even if the defective insert is discovered during the shell test, the valve must still be disassembled and the seats must be removed and provided with new inserts if they are to function effectively. In addition, the time and expense of machining the defective insert has already been incurred.

A somewhat similar problem exists with respect to seat inserts of the type that are held in place by lips of the seats which are swaged into the inserts. After swaging of the lip, the sealing surface of the insert is machined and the seat assembly is installed in the valve body. If the insert is completely bottomed in its groove prior to swaging of the lip, the fluid pressure applied to the valve during service can bottom out those portions of the insert where gaps are present. The insert is thereby torn or otherwise damaged in the area of the swaged lip, and, more importantly, the sealing surface is depressed to such an extent that it fails to adequately seal against the valve member. Again, the defective inserts may be discovered during a shell test, but only after the seals have been installed in the valve body. The valve must then be disassembled and provided with new seats before it is reassembled and put in service. Consequently, even if a defect in the insert is discovered during the shell test, costly time is wasted and considerable difficulty is encountered in assembling and disassembling the valve.

SUMMARY OF THE INVENTION

The present invention provides an improved method of forming a valve seat wherein hydraulic fluid pressure is used to completely bottom out a plastic face seal or insert in a groove of the valve seat before the seat is installed in a valve body. This procedure assures that the insert is able to effectively seal against the valve member and eliminates the time and expense resulting from defective inserts.

In accordance with a first form of the invention, the insert is installed in a serrated annular groove of the valve seat, with assistance from a mallet in some cases, and is pressed into the groove by a power driven ram such that it cold flows into the serrations of the groove to secure it in place therein. Before the sealing surface of the insert is machined, the seat is subjected to uniform hydraulic pressure which completely bottoms the insert in the groove so that there are no gaps at the base of the insert. Finally, the sealing surface is machined to the desired height and the valve seat is installed in the valve body with assurance that the insert is able to effectively seal against the valve member.

The invention is also directed to a method of forming a valve seat and testing whether a plastic insert is properly bottomed in the groove which receives it. In this form of the invention, the insert is fitted in a non-serrated groove of a valve seat, and a lip of the seat is swaged into the insert to hold it in place in the groove. Before the seat is installed in the valve body, it is subjected to hydraulic pressure which assures that the insert is completely bottomed in the groove. The insert can then be inspected to determine whether its sealing surface protrudes out of the groove far enough to provide an effective seal. If it does not, the seat can be replaced without assembly time having been expended installing a defective seat in the valve body.

DETAILED DESCRIPTION OF THE INVENTION

In the accompanying drawings which form a part of the specification and are to be read in conjunction therewith:

FIG. 1 is a fragmentary sectional view of an expanding type gate valve equipped with a pair of seat assemblies constructed in accordance with the present invention;

FIG. 2 is a fragmentary sectional view on an enlarged scale of one of the valve seats shown in FIG. 1, with a plastic insert in position to be installed in a serrated groove of the seat and with a mallet head applied to the insert;

FIG. 3 is a fragmentary sectional view of the valve seat shown in FIG. 2, with the insert installed in the groove and a power driven ram applied to the insert;

FIG. 4 is a fragmentary sectional view similar to FIG. 3 but showing the insert after it has been pressed into the groove to cold flow into the serrations;

FIG. 5 is a fragmentary sectional view similar to FIG. 4, but showing hydraulic fluid pressure being applied to the insert to completely bottom it in the groove;

Figure 6:
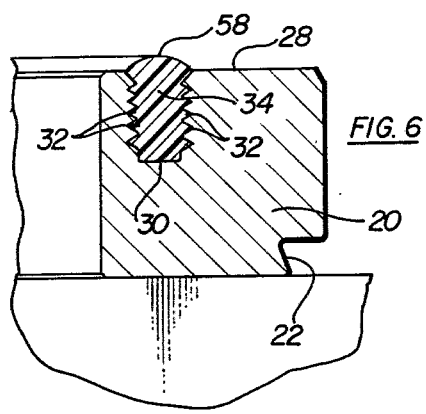
FIG. 6 is a fragmentary sectional view of the valve seat shown in FIG. 5, with the sealing surface of the insert machined to the desired size and configuration.
Figure 8:
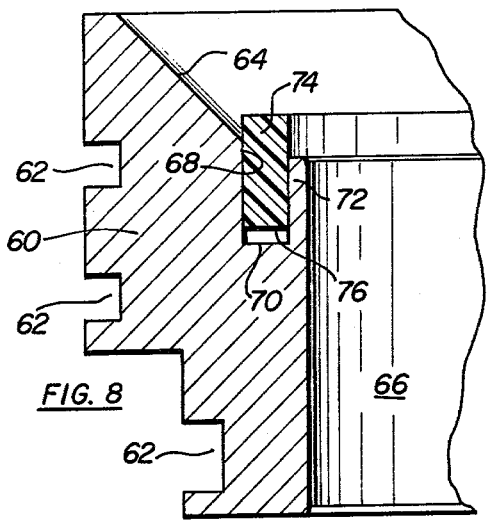
FIG. 8 is a fragmentary sectional view of a ball valve seat, with a plastic insert installed in a non-serrated groove of the seat in accordance with a modified form of the invention.

Referring now to the drawings in more detail and initially to FIG. 1, numeral 10 designates the body of an expanding type gate valve. Valve body 10 has a flow passage 12 therethrough which includes a central valve chamber 14. An expanding type gate assembly 16 is mounted in valve chamber 14 for movement between an open position and a closed position relative to the flow passage 12. Although an expanding gate assembly 16 is shown, it is to be understood that other types of valve members may be used. A pair of annular seat pockets 18 are formed about valve chamber 14 to receive annular metal valve seats 20 which are constructed according to the method of the present invention. Each seat 20 is provided with a groove 22 around its outer surface. O-rings 24 are received in grooves 22 to provide a seal between each seat 20 and valve body 10.

In accordance with the invention, each valve seat 20 is provided with a serrated groove 26 which is best shown in FIG. 2 and which is machined in the seat in a well known manner. Groove 26 is annular in shape and is formed in a generally flat seating surface 28 of the seat which faces toward gate assembly 16. Groove 26 has a flat bottom surface 30 which is parallel to seating surface 28, and the groove also includes spaced apart inner and outer sides which are parallel to one another and which are each provided with a series of serrations 32.

Groove 26 receives an annular resilient plastic insert 34 which has a width to fit rather tightly in the groove and a height dimension considerably greater than the depth of the groove. Insert 34 is generally rectangular in section. Insert 34 is preferably formed of polytetrafluoroethylene which is available under the trademark "Teflon", although it may be formed of any other suitable material capable of effectively sealing against gate assembly 16.

Insert 34 is manually pressed into groove 26 toward the bottom surface 30. Such insertion can be carried out with the assistance of a mallet 36 (FIG. 2) in cases where the fit of insert 34 into groove 26 is tight enough to require hammering of the insert into the groove. Due to imperfections in groove 26 or insert 34 or due to a lack of uniformity in the force applied to press the insert into the groove, gaps such as that indicated at 38 in FIG. 3 exist between the bottom of insert 34 and the bottom surface 30 of groove 26. After insert 34 has been installed in groove 26, the outer portion of the insert protrudes out of the groove well beyond the seating surface 28 of seat 20.

With reference now to FIG. 3 in particular, seat 20 is next installed in a mechanical press device which includes a power driven press member or ram 40 having a flat lower surface. The press member 40 is driven downwardly against the top surface of insert 34 with enough force to effect cold flowing of the plastic insert into the serrations 32 of groove 26, thereby securing the insert in the groove. It is pointed out that when hammering of the insert into groove 26 is necessary, the upper surface of the insert will often be uneven and can present low spots such as those indicated at 42. Consequently, ram 40 is not applied evenly to the entire surface of insert 34, and insert 34 does not fill groove 26 completely. Therefore, gaps such as gap 36 remain between the bottom of insert 34 and the bottom surface 30 of the groove, as shown in FIG. 4. Even if the surface of insert 34 is flat and there are no low spots, the force of ram 40 is sometimes applied in a non-uniform manner such that gaps still exist.

After seat 20 has been removed from the press device, the method of the present invention involves subjecting it to hydraulic fluid pressure which is high enough to completely bottom insert 34 against the bottom surface 30 of groove 26 along the entire length or circumference of the insert. The application of fluid pressure against insert 34 is shown diagrammatically in FIG. 5, and it is pointed out that all gaps are eliminated between the bottom of the insert and the bottom of the groove.

Figure 7:
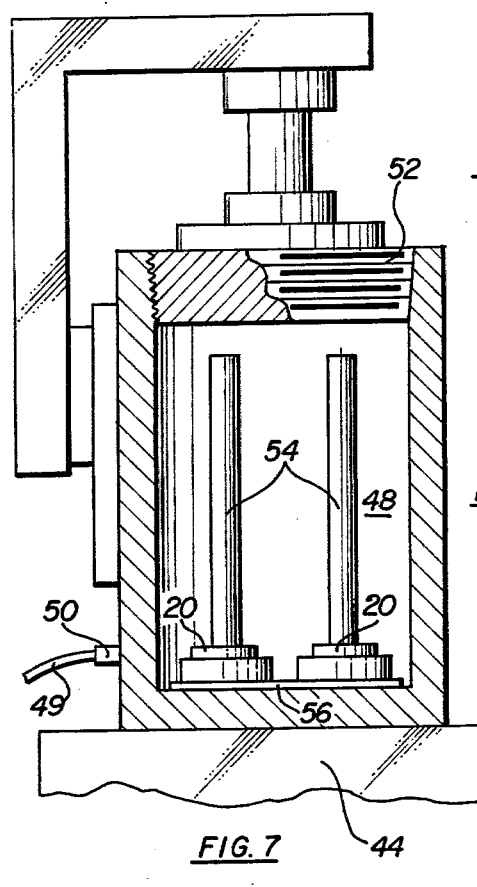
FIG. 7 is a diagrammatic view showing schematically the type of equipment which may be used to subject valve seats to hydraulic fluid pressure in accordance with the invention.

FIG. 7 illustrates equipment of the type that may be used to carry out the application of fluid pressure to seats 20. A base 44 supports a boxlike enclosure 46 which presents therein an enclosed pressure chamber 48. The pressure chamber 48 is adapted to receive pressurized hydraulic fluid through a fluid line 49 which connects with a fitting 50 extending through a side wall of enclosure 46. A cap 52 may be screwed tightly onto the top of enclosure 46 to completely enclose pressure chamber 48 in sealed fashion. A pair of upright cylindrical posts 54 are disposed within chamber 48 in extension upwardly from a base plate 56. Each post 54 has a diameter slightly smaller than the inner diameter of seat 20. A plurality of valve seats may thus be fitted over each post 54 and stacked on top of one another. Each seat 20 is inserted in pressure chamber 48 with insert 34 in the groove 26 of the valve seat. Hydraulic fluid at the desired pressure may then be applied to chamber 48 through line 49 and fitting 50, thereby applying the hydraulic pressure against the insert 34 of each valve seat.

The pressure level of the fluid should be sufficient to assure that insert 34 is bottomed out against surface 30 along the entire circumference of the insert. It has been found that a pressure level of at least one and one half times the maximum working pressure of the valve in which seat 20 is to be used is sufficient to completely bottom the insert in groove 26. Accordingly, it is preferred that such a pressure level be applied to the valve seat, although lower pressures may suffice in some circumstances. It has also been found that maintaining the pressure against the valve seat for approximately thirty (30) minutes achieves good results, although again the time period of pressure application may be varied considerably depending upon the circumstances. Generally, a time range of between ten (10) to fifty (50) minutes may be used, with thirty (30) minutes being preferred in most cases.

After seat 20 and its insert 34 have been subjected to fluid pressure, the seat is removed from pressure chamber 48. The portion of insert 34 which projects out of groove 26 is then machined so that it protrudes the desired distance beyond seating surface 28 to provide an effective seal with gate assembly 16. As shown in FIG. 6, the machining operation provides an arcuate sealing surface 58 on insert 34, although it may be of any other desired configuration.

When the valve is subsequently put in service or subjected to a shell test, the fluid pressure applied to insert 34 does not displace the insert since it is completely bottomed out in groove 26 and completely fills the groove. Consequently, sealing surface 58 of the insert remains in position to effectively seal against the valve member at all times.

Referring now to FIGS. 8–11, the present invention is directed additionally to a method which involves forming and testing a valve seat 60 of a ball valve (not shown). Seat 60 is an annular metallic member which fits in a seat pocket of a ball valve body in a manner well known to those skilled in the art. Seat 60 has grooves 62 on its outer surface for receiving O-rings (not shown) which seal between seat 60 and the body of the ball valve. Seat 60 has a frusto-conical seating surface 64 which faces toward a ball member (not shown) which opens and closes a flow passage 66 extending through the valve body. An annular groove 68 is formed in seating surface 64 and is generally rectangular in section. Groove 68 has a flat bottom surface 70 and inner and outer sides which are spaced apart and parallel to one another. The inner side of groove 68 terminates in a lip 72 of seat 60 which is located adjacent the flow passage 66.

Groove 68 receives an annular resilient plastic insert 74 which may be formed of "Teflon" material or another substance capable of providing a suitable seal against the ball valve member. Insert 74 provides a face seal and is generally rectangular in section, having a width slightly less than that of groove 68 and a height dimension considerably greater than the depth of the groove.

Figure 9:
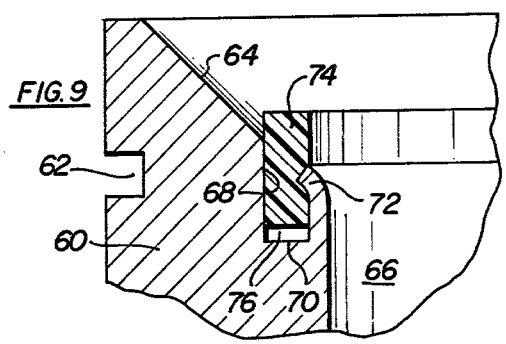
FIG. 9 is a fragmentary sectional view similar to FIG. 8 but showing a lip of the valve seat swaged into the plastic insert to hold it in the groove.
Figure 10:
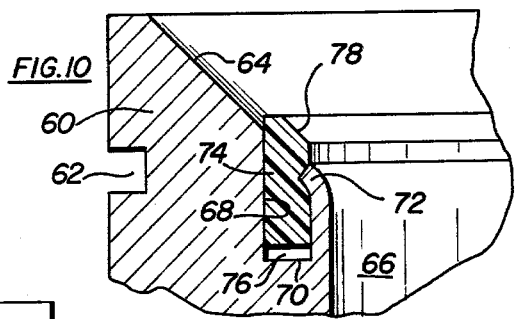
FIG. 10 is a fragmentary sectional view similar to FIG. 9 but showing the sealing surface of the insert machined to the desired configuration.

Insert 74 is inserted in groove 68 manually with the upper end portion of the insert protruding out of the groove well beyond seating surface 64. Lip 72 is then forcefully swaged outwardly by a power driven ram (not shown) into the inner side of insert 74 to thereby rigidly secure the insert in groove 68, as shown in FIG. 9. Due to imperfections or unevenness in insert 74 or the bottom surface 70 of the groove, the insert is not always bottomed completely against the bottom of the groove, and gaps such as that indicated at 76 sometimes exist between the bottom of the insert and the bottom of the groove. As shown in FIG. 9, gap 76 remains after lip 72 is swaged into the side of insert 74.

The outer surface of insert 74 is machined to provide a sealing surface 78 for sealing against the ball member. Such machining of the insert may be carried out before it is inserted into groove 68, after insertion but before swaging of lip 72 into the insert, or after swaging of the lip. In any event, surface 78 is machined to the desired size and shape to effectively seal against the ball valve member.

Figure 11:
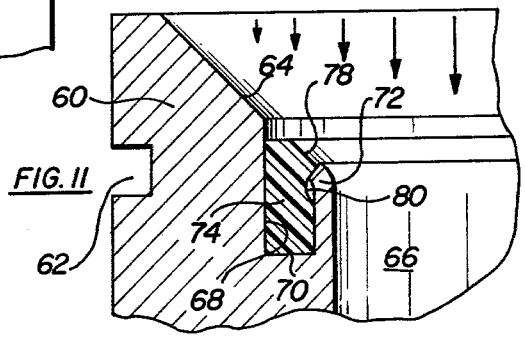
FIG. 11 is a fragmentary sectional view similar to FIG. 10 but showing hydraulic pressure being applied to the insert to completely bottom it in the groove.

Before seat 60 is installed in its seat pocket of the valve body, it is subjected to hydraulic fluid pressure sufficient to bottom insert 78 completely against the bottom of groove 68, as shown in FIG. 11. In the areas where gaps such as gap 76 are present before the application of fluid pressure, insert 74 is torn or otherwise damaged by lip 72 as indicated at 80 in FIG. 11. In addition, the downward movement of the insert in the area of the gaps pushes sealing surface 78 downwardly such that it is out of position to seal effectively with the ball member. In some cases, surface 78 may be depressed below surface 64 where it cannot seal with the ball member at all. Visual examination of the insert after the application of fluid pressure provides an indication of whether or not the sealing surface 78 protrudes out of the groove far enough to effectively seal against the ball member. If it does not, this fact is ascertained prior to insertion of the valve seat in the valve body. Consequently, assembly time line is saved because the defect in the valve seat is discovered without the necessity of installing the seat in a valve body. Moreover, a defective seat is not put into actual service as might otherwise occur.

Seat 60 may be subjected to hydraulic pressure in the pressure chamber 48 shown in FIG. 7 or in any other suitable manner. It has been found that applying hydraulic fluid pressure to seat 60 at a level of at least one and one half times the working pressure of the valve is sufficient to assure that insert 74 is completely bottomed in groove 68 around the entire circumference of the insert. Consequently, fluid pressure at this level is preferred, although lower fluid pressures will suffice in some circumstances. Again, the fluid pressure is preferably maintained against the seat for a time period of between ten (10) and fifty (50) minutes with thirty (30) minutes being preferred in most situations.

I claim:

1. A method of forming a valve seat comprising the steps of:
    forming in a seating surface of the valve seat a serrated annular groove having a bottom surface and opposite sides each presenting a plurality of serrations;
    inserting a resilient insert into said groove with a portion of the insert protruding out of the groove beyond said seating surface;
    pressing said insert toward the bottom surface of the groove with sufficient force to effect cold flowing of the insert into said serrations;
    inserting the entire valve seat into an enclosed hydraulic fluid pressure chamber with the insert in said groove of the valve seat;
    applying hydraulic fluid pressure to said pressure chamber for a time period between around ten (10) to fifty (50) minutes at a level of at least approximately one and one half times the maximum working pressure of the valve in which said valve seat is to be used to bottom said insert against the bottom surface of the groove along the entire length of the groove; and
    machining the protruding portion of said insert to provide a sealing surface thereon after completion of the fluid application step.

2. A method as set forth in claim 1, wherein the step of inserting said insert includes hammering at least part of the insert toward the bottom surface of the groove.

3. A method as set forth in claim 2, wherein the step of pressing said insert toward the bottom surface of the groove comprises applying a power driven press member against said insert.

4. A method as set forth in claim 1, wherein a plurality of valve seats are placed within the enclosed hydraulic fluid pressure chamber for simultaneous application of the fluid application step.

5. A method of positioning a resilient face seal insert within a serrated annular groove in a seating surface of an annular metal seat, the groove having a bottom surface and opposite sides each presenting a plurality of serrations; said method comprising the steps of:

first inserting the resilient insert into said groove with a portion of the insert protruding out of the groove beyond said seating surface;

pressing said insert toward the bottom surface of the groove with sufficient force to effect cold flowing of the insert into said serrations;

inserting the entire valve seat into an enclosed hydraulic fluid pressure chamber with the insert in said groove of the valve seat;

applying hydraulic fluid pressure to said pressure chamber for a time period between around ten (10) to fifty (50) minutes at a sufficient fluid pressure to bottom said insert against the bottom surface of the groove along the entire length of the groove; and machining the protruding portion of said insert to provide a sealing surface thereon after completion of the fluid application step.

6. A method as set forth in claim 5, wherein a plurality of annular valve seats are inserted within the enclosed hydraulic fluid pressure chamber for simultaneous application of the fluid application step.

* * * * *